March 26, 1957     W. E. WALLES ET AL     2,786,780
COATING PROCESS FOR POLYETHYLENE AND
COMPOSITE ARTICLES OBTAINED THEREBY
Filed May 25, 1956

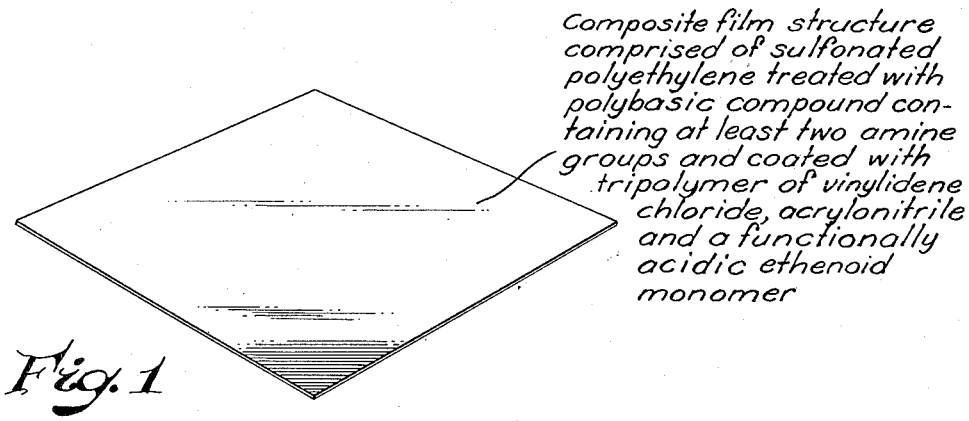

Fig. 1 — Composite film structure comprised of sulfonated polyethylene treated with polybasic compound containing at least two amine groups and coated with tripolymer of vinylidene chloride, acrylonitrile and a functionally acidic ethenoid monomer

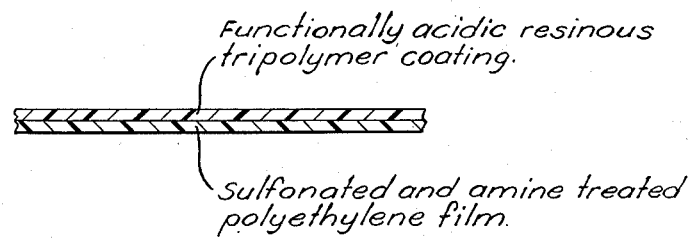

Fig. 2 — Functionally acidic resinous tripolymer coating. Sulfonated and amine treated polyethylene film.

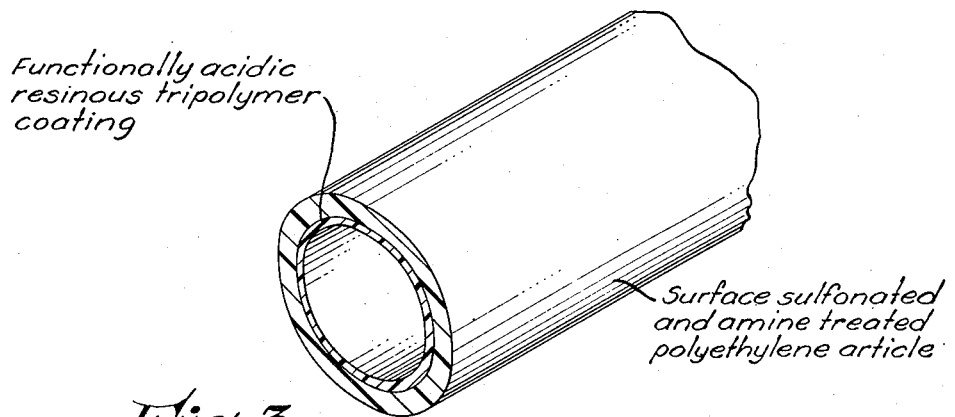

Fig. 3 — Functionally acidic resinous tripolymer coating. Surface sulfonated and amine treated polyethylene article.

INVENTORS.
Wilhelm E. Walles
Harold G. Hahn

BY Griswold & Burdick
ATTORNEYS

United States Patent Office 2,786,780
Patented Mar. 26, 1957

2,786,780
COATING PROCESS FOR POLYETHYLENE AND COMPOSITE ARTICLES OBTAINED THEREBY

Wilhelm E. Walles and Harold G. Hahn, Midland, Mich., assignors to The Dow Chemical Company, Midland, Mich., a corporation of Delaware Application May 25, 1956, Serial No. 587,362

20 Claims. (Cl. 117—62)

This invention relates to a process for coating polyethylene films and other shaped articles with resinous layers comprised of a tripolymer of vinylidene chloride, acrylonitrile and a functionally acidic ethenoid monomer. It also has reference to the coated articles, particularly films, which may thereby be obtained.

Films and other shaped and molded articles of polyethylene have many attractive characteristics including in general, good physical properties and, in particular, excellent behavior and resistance to embrittlement at low temperatures. Despite these attributes, however, shaped articles of polyethylene frequently may not have a satisfactory ability to provide effective barriers against the transmission or permeation of certain gases and vapors, particularly oxygen. Furthermore they do not always have suitable clarity and transparency and are prone to become scuffed and marred on their surface despite their otherwise strong and tough characteristics.

While certain of these shortcomings of polyethylene might be compensated for by coating it with various resinous materials having complemental properties to provide composite articles having more completely satisfactory characteristics, difficulties have been encountered in the derivation of such articles. This is usually because of the inefficient bonding and poor adherence that is experienced when most resinous materials are attempted to be coated on polyethylene surfaces in order to form composite structures. Polyethylene film and other articles, as is well known, commonly have a smooth and sleek, relatively slippery and wax like surface which is poorly adapted to provide for suitable adhesion or anchorage of applied materials by mere physical attachment. Furthermore, the relatively inert chemical nature of polyethylene resists the efficient attachment of most materials by chemical interlinkage or bonding.

It is among the principal objects of the present invention to provide an efficient and effective method for coating polyethylene films and other articles with tightly adhering integral layers of a resinous tripolymer of vinylidene chloride, acrylonitrile and a functionally acidic ethenoid monomer (which is polymerizable while retaining its pendant, acidic functional groups available for further combination) so as to provide useful composite structures of polyethylene films and articles and the resinous coatings on the articles which are particularly adapted for employment at relatively low temperatures as flexible materials for packaging and the like that have improved gas and vapor barrier characteristics, better clarity and a more scuff-resistant surface.

According to the invention, polyethylene articles may be effectively provided with a tightly adhering and firmly anchored coating of a resinous tripolymer of vinylidene chloride, acrylonitrile and a functionally acidic ethenoid monomer by a method which comprises sulfonating the surface of the polyethylene article, treating the sulfonated surface with a polybasic compound containing at least two amine groups to provide said surface with a basic reactive polarity and subsequently applying a layer of the functionally acidic resinous tripolymer over the amine treated sulfonated surface.

The composite articles (as illustrated by the composite film which is depicted perspectively in Figure 1 and cross-sectionally in Figure 2 and by the coated tubular article shown perspectively in Figure 3 of the accompanying drawing), which advantageously may be obtained by practice of the invention, possess the desirable and beneficial characteristics of polyethylene while having improved gas and vapor barrier properties, especially to oxygen, greater resistance to scuffing and better clarity. Composite film structures in accordance with the invention, for example, may generally be obtained with only a very slight degree of haziness which is not discernible upon ordinary visual inspection and which has been reduced almost to the vanishing point from the haze that is present in the original polyethylene film. II addition, the applied coating, in most instances, is extremely difficult if not completely impossible to strip from the surface of the sulfonated polyethylene film or other article by ordinary physical methods.

Composite film structures may advantageously be prepared in accordance with the present invention. Such film structures have particular utility as wrapping and packaging materials for foodstuffs and other articles which are intended to be handled or maintained and stored at relatively low temperatures in a refrigerated or frozen condition. Other composite structures including tubes, hose, flexible bottles and other containers such as cartons and boxes may also be made with advantage by practice of the invention.

Advantageously, relatively thin polyethylene films are employed in order to obtain composite film structures according to the invention. Beneficial results, for example, are readily obtainable with films having a thickness which is not greatly in excess of about 20 mils. It is frequently even more beneficial to employ polyethylene films having a thickness between about 0.5 and 5 mils. The polyethylene film which is employed in the practice of the present invention as well as other polyethylene articles may be derived from polyethylene of any nature. The polymers of ethylene which are employed may, for example, be similar to those which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, they may be similar to the essentially linear and unbranched polymers which have been referred to as "ultrathenes" and which ordinarily have greater apparent molecular weights (as may be determined from such characteristics as their melt viscosities and the like) in excess of about 40,000; densities of about 0.94–0.96 grams per cubic centimeter; and melting points in the neighborhood of 125–135° C. They are ordinarily found to have a more crystalline nature than conventional polyethylenes and may contain less than 3.0 and even less than 0.3 methyl radicals per 100 methylene groups in the polymer molecule. The essentially linear and unbranched polymers of ethylene may be obtained under relatively low pressures of 1 to 100 atmospheres using such catalysts for polymerizing the ethylene as mixtures of strong reducing agents and compounds of group IV-B, V-B and VI-B metals of the periodic system, chromium oxide on silicated alumina, hexavalent molybdenum compounds, and charcoal supported nickel-cobalt.

The surface of the polyethylene may be sulfonated by subjecting it to the action of a sulfonating reagent selected from the group consisting of concentrated sulfuric acid containing at least about 98 percent by weight of $H_2SO_4$, oleum, anhydrous solutions of oleum and free sulfur trioxide. Advantageously, the sulfonated surface may be washed free from excess sulfonating reagent prior to the application of the resinous coating.

While the surface sulfonation of the poleythylene may be accomplished with any of the mentioned sulfonating reagents, it is usually more advantageous to employ oleum (which is sometimes known as fuming sulfuric acid) containing from trace amounts to about 10 percent by weight of dissolved, free sulfur trioxide. If desired, the oleum can also be employed beneficially in anhydrous solutions with other materials such as acetic anhydride and the like which permit effective quantities of the sulfur trioxide to be available in an amount which is equivalent to that which is provided in the oleum. In certain instances, it may be convenient to employ free sulfur trioxide vapors which, beneficially, may be diluted to a concentration as low as 10 percent or less, for example, with a suitable inert gas such as nitrogen.

Generally, a satisfactory degree of surface sulfonation may be obtained when operating at temperatures between the freezing point of the sulfonating reagent and about 150° C. for periods of time ranging from matters of merely several seconds or even almost instantaneous periods which involve mere fractions of seconds to hours. Frequently, when an oleum is employed which contains dissolved, free sulfur trioxide in amounts ranging from traces to about 10 percent by weight, the surface sulfonation may be performed suitably at an operating temperature of about 50° C. within a time period of about five minutes.

The degree of surface sulfonation which is obtained on the polyethylene article predetermines to a great extent the amount of the polybasic, amine group-containing compound that may be retained on the surface to provide it with a basic reactive polarity and consequently has an effect on the bonding that may be obtained between the polyethylene and the subsequently applied, functionally acidic resinous coating. For all practical purposes, it precurses the results which may be realized by practice of the invention. The degree of sulfonation that may be obtained in any particular instance is somewhat interdependent on the nature of the polyethylene and the specific physical form or structure of the polyethylene article that is being treated, the strength or effective sulfur trioxide concentration of the reagent, the operating temperature and the length of the treatment. Care should be taken to avoid sulfonation conditions which may be too drastic, as may occur when an oleum is employed with a relatively high free sulfur trioxide content at too high a temperature or for too long a period of time. Care should also be taken to employ more moderate treating conditions upon more delicate structures such as exceptionally fine films and the like. If such precautions are not assiduously observed, the polyethylene article may be caused to decompose and degrade resulting in its being darkened and discolored to an intolerable extent. Conversely, optimum coating results may not be obtained if overly weak sulfonating conditions are employed which may not sufficiently modify the surface of the polyethylene article to permit a suitably beneficial quantity of the coating to be effectively and permanently applied thereto.

The polybasic compound that contains at least two amine groups that may be employed in the practice of the present invention for treating the sulfonated polyethylene surface to provide it with a basic reactive polarity may advantageously be a polyamine or an alcamine or polyglycolpolyamine type of material. If desired it may be a relatively low molecular weight polyamine such as ethylene diamine, diethylene triamine, triethylene tetraamine and the like. However, high molecular weight polyamine materials such as polyvinylpyrrolidone may also be advantageously employed in the practice of the invention. Likewise polyglycolpolyamines having a molecular weight in excess of 100 are also beneficial.

Since the application of the polybasic compound on the sulfonated polyethylene surface is essentially in the nature of a metathetical reaction, there is little criticality involved in the conditions of its employment with respect to time, temperature and concentration. It is usually beneficial and convenient, however, to apply it from a relatively low concentration dispersion or solution, as between about 1 and 5 percent by weight, in a suitable liquid medium such as water. This manner of employment permits immersion of the sulfonated polyethylene in an applicating bath of the polybasic compound although, if desired, other applicating techniques may also be utilized for the polybasic compound.

The resinous tripolymer that may be employed for coating the surface of the sulfonated polyethylene may contain between about 40 and 90 percent by weight of vinylidene chloride, between 5 and 60 percent by weight of acrylonitrile, and between 1 and 15 percent by weight of the functionally acidic ethenoid monomer polymerized in the tripolymer molecule. Advantageously, it may contain between about 50 and 70 percent by weight of the vinylidene chloride, between 30 and 50 percent by weight of the acrylonitrile and between 2 and 12 percent by weight of the functionally acidic ethenoid monomer. The functionally acidic ethenoid monomer that is employed, as is apparent, is a material that retains a functional acidity and imparts this characteristic to the resinous tripolymer after being polymerized in the tripolymer molecule. Advantageously, acrylic acid, styrene sulfonic acid, sodium styrene sulfonate and the like may be employed for this purpose. The functionally acidic resinous tripolymer may be prepared readily according to procedures that are apparent to those skilled in the art such as by means of an emulsion polymerization technique using peroxy type free radical generating catalysts.

The functionally acidic resinous tripolymer may be utilized suitably in several ways in order to obtain a coated layer of the resin on the sulfonated polyethylene film or other article. They may be cast on the sulfonated polyethylene surface from a dissolved composition formulated with suitable solvents, such as in lacquer formulations or they may be deposited from latex compositions or with polymerizing mixtures of the monomeric substances which are polymerized in the desired resin. The casting may be accomplished by various spread, dip, brush or spray techniques. After their application, the resinous tripolymer compositions may be dried, cured or treated according to usual and conventional techniques to remove or countereffect solvents, vehicles or other admixed ingredients and to effect a solid deposition of the tightly adhering resinous tripolymer layer in the composite structure.

Advantageously, the casting to form composite film structures may be performed suitably by spread coating a dissolved or lacquer formulation of the functionally acidic resinous tripolymer over the sulfonated film. While different thicknesses may also be beneficial, it is desirable for the applied layer of the resinous tripolymer on the sulfonated surface of any polyethylene article to be at least about 0.02 mil thick and even more desirable for many applications for it to have a thickness between about 0.1 and 2.0 mils. As is apparent, films may, if desired, be coated on both of their surfaces in accordance with the invention. In a similar manner, all of the coatable surfaces of other articles such as both of the inner and outer surfaces of containers and the like or either surface or any desired portion of a particular surface may, if desired, be provided with the resinous tripolymer coating.

Since the application on the sulfonated polyethylene surface of the functionally acidic resinous tripolymer containing the functionally acidic ethenoid monomer polymerized therein has somewhat the aspects of a metathetical reaction, good adhesion may generally be achieved with any method of application. The retention of the applied resinous tripolymer coating by the polyethylene in the practice of the invention is due not only to the physical influences of so-called Van de Waal's forces and the like but also to the bonding ionic attraction that is involved between the functionally acidic coating and the basic surface of the polyethylene that has been sulfonated and amine treated.

By way of exemplary illustration, a polyethylene film having a thickness of about 1 mil which was of the type known as "Dura-Clear" polyethylene film and which is obtainable from The Harwid Company of Boston, Massachusetts, was surface sulfonated by being immersed in a 3 percent oleum (which contains about 3 percent by weight of free sulfur trioxide dissolved in $H_2SO_4$) at a temperature of about 50° C. for about ten minutes. After being sulfonated, the film was amine treated by being immersed in a 2 percent by weight aqueous solution of ethylene diamine at a temperature of about 50° C. for about five minutes. The sulfonated and amine treated film was then washed thoroughly in water and dried before being coated with a functionally acidic resinous tripolymer containing about 55 percent by weight of vinylidene chloride, about 36 percent by weight of acrylonitrile and the balance of acrylic acid polymerized in the tripolymer molecule. The functionally acidic resinous tripolymer had been prepared by an emulsion polymerization method using a hydrogen peroxide catalyst. It was dissolved in acetone to form about a 15 percent by weight solution which was cast on the sulfonated polyethylene film to provide a uniform coating, after removal of solvent by drying, that had a thickness of about 1.0 mil. The applied coating could not be stripped off the film in an adhesion test which consisted of pressing a strip of conventional cellophane tape (such as that which is obtainable under the name "Scotch" adhesive cellophane tape from the Minnesota Mining and Manufacturing Company) on the coated surface and subsequently pulling the tape away. The coated film had good flexibility and did not become embrittled at temperatures as low as −20° C. In addition, its effectiveness as a vapor barrier was improved over that which is characteristic of the uncoated polyethylene film. Further, the coated film had excellent resistance to surface scuffing and was clear and transparent. Its degree of haziness was reduced substantially completely in comparison to that which was present in the original polyethylene film.

Results equivalent to the foregoing were obtained when the procedure was repeated identically excepting that the functionally acidic resinous tripolymer that was employed for coating the sulfonated and amine treated polyethylene film contained about 77 percent by weight of vinylidene chloride, about 20 percent by weight of acrylonitrile and about 3 percent by weight of sodium styrene sulfonate polymerized in the polymer molecule.

Analogous results are obtainable when sulfonated films of essentially linear and unbranched polyethylene and when other surface sulfonated and amine treated polyethylene articles are coated in accordance with the invention in a manner similar to the foregoing.

It is to be fully understood that the present invention is to be construed and interpreted not by the foregoing didactic description and specification but in the light of what is set forth and defined in the appended claims.

What is claimed is:

1. Method for coating a polyethylene article with a resinous tripolymer of vinylidene chloride, acrylonitrile and a functionally acidic ethenoid monomer which comprises sulfonating the surface of the polyethylene, treating the sulfonated surface with a polybasic compound containing at least two amine groups to provide said surface with a basic reactive polarity, and subsequently applying a layer of the resinous tripolymer over the sulfonated surface.

2. In the method of claim 1, sulfonating the surface of the polyethylene by subjecting it to a sulfonating reagent which is selected from the group consisting of concentrated sulfuric acid containing at least about 98 percent by weight of $H_2SO_4$, oleum, anhydrous solutions of oleum and free sulfur trioxide.

3. A method in accordance with the method set forth in claim 2 wherein the sulfonating reagent is comprised of oleum that contains from trace amounts to about 10 percent by weight of dissolved, free sulfur trioxide.

4. A method in accordance with the method set forth in claim 2 wherein the polyethylene is subjected to the sulfonating reagent at a temperature between the freezing point of the reagent and about 150° C.

5. A method in accordance with the method set forth in claim 2 wherein the sulfonating reagent is comprised of oleum that contains from trace amounts to about 10 percent by weight of dissolved, free sulfur trioxide and the polyethylene is subjected to the oleum at a temperature of about 50° C. for about five minutes.

6. In the method of claim 1, treating the sulfonated surface of the polyethylene with a polyamine.

7. In the method of claim 1, treating the sulfonated surface of the polyethylene with a low molecular weight polyamine.

8. In the method of claim 1, treating the sulfonated surface of the polyethylene with ethylene diamine.

9. In the method of claim 1, treating the sulfonated surface of the polyethylene with an alcamine.

10. In the method of claim 1, treating the sulfonated surface of the polyethylene with a polyglycolpolyamine.

11. The method of claim 1, wherein the polyethylene article is a film having a thickness which is not in excess of about 20 mils.

12. The method of claim 1, wherein the polyethylene article is a film having a thickness which is between about 0.5 and 5 mils.

13. The method of claim 1, wherein the resinous tripolymer contains between about 40 and 90 percent by weight of vinylidene chloride, between about 5 and 60 percent by weight of acrylonitrile and between about 1 and 15 percent by weight of the functionally acidic ethenoid monomer polymerized in the tripolymer molecule.

14. The method of claim 1 wherein the layer of the resinous tripolymer which is applied over the sulfonated surface has a thickness of between about 0.1 and 2.0 mils.

15. A composite structure that has been prepared in accordance with the method set forth in claim 1.

16. A composite structure in accordance with the composite structure claimed in claim 15 wherein the surface sulfonated and amine treated polyethylene article is a film having a thickness between about 0.5 and 5 mils.

17. A composite structure in accordance with the composite structure claimed in claim 15 wherein the layer of resinous tripolymer that has been applied over the sulfonated surface contains between about 40 and 90 percent by weight of vinylidene cloride, between about 5 and 60 percent by weight of acrylonitrile, and between about 1 and 15 percent by weight of a functionally acidic ethenoid monomer polymerized on the tripolymer molecule.

18. The composition structure of claim 15, wherein the tightly adhering layer of the resinous tripolymer has a thickness between about 0.1 and 2.0 mils.

19. The composition structure of claim 15, wherein the functionally acidic ethenoid monomer that is polymerized in the tripolymer molecule is an acrylic acid monomer.

20. The composite structure of claim 15, wherein the functionally acidic ethenoid monomer that is polymerized in the tripolymer molecule is a sulfonated styrene monomer.

References Cited in the file of this patent

UNITED STATES PATENTS

| | | |
|---|---|---|
| 2,400,720 | Staudinger | May 21, 1946 |
| 2,689,197 | Gerlich | Sept. 14, 1954 |
| 2,715,076 | Wolinski | Aug. 9, 1955 |
| 2,727,831 | Dixon | Dec. 20, 1955 |